Patented June 9, 1953

2,641,570

UNITED STATES PATENT OFFICE 2,641,570

SWEETENING PETROLEUM OILS

Harold A. Ricards, Jr., Cranford, and Byron M. Vanderbilt and Erving Arundale, Westfield, N. J., assignors to Standard Oil Development Company, a corporation of Delaware No Drawing. Application March 4, 1950, Serial No. 147,764

4 Claims. (Cl. 196—29)

The present invention is concerned with the production of high quality petroleum oil products. The invention is more particularly concerned with the production of high quality petroleum oil products from virgin oils. In accordance with the present process, high quality oil products are produced by contacting virgin petroleum oil fractions under controlled conditions with a caustic solution and an oxygen-containing gas.

It is well known in the art to refine hydrocarbon fractions by various processes in order to remove objectionable constituents therefrom. Thus, it is known to treat hydrocarbon fractions with chemical reagents such as sulfuric acid and caustic solutions in order to remove various sulfur compounds. It has also been suggested that hydrocarbon fractions be contacted with caustic such as a sodium hydroxide solution in the presence of air or oxygen and a catalyst such as petroleum phenols. However, in these processes wherein caustic and oxygen have been utilized, variable results have been obtained in plant scale operations due apparently to difficulties in getting good contact.

It has now been discovered that unexpectedly improved results are obtained if the oil is treated with an oxygen containing gas under conditions which lead to the formation of quick-breaking emulsions. By carrying out the process in this manner, the contact between the oil and the oxygen is enhanced. However, by employing conditions in which the emulsion breaks within a short time after completion of the treating process no difficulty is encountered in separating the oil therefrom in the subsequent washing step. According to the present invention, the above results are obtained by contacting the oil with air or oxygen in the presence of an alkali metal hydroxide, an emulsifying agent such as alkali metal salts of fatty acids, sulfates of alcohols of twelve or more carbon atoms, sulfonates of alkylated benzenes, rosin acids, the condensation products of oleyl alcohol with ethylene oxide, and the like, and petroleum phenols as a catalyst. Other suitable emulsifying agents include any of the surface active agents disclosed in "Industrial Engineering Chemistry" for January, 1939, pages 66–69; January, 1941, pages 16–22; January, 1943, pages 126–130. From the standpoint of low cost and stability towards oxygen under the conditions employed, the rosin soaps are preferred.

Instead of using alkali hydroxides, other alkaline materials, such as alkali carbonates, cyanides, bisulfites, etc., may be used. Organic bases such as the amines and quaternary ammonium compounds are also useful.

The present invention is concerned with the treatment of various petroleum oils, such as gasoline, naphtha, heating oils, kerosene, etc. The invention is particularly applicable for treating so-called virgin oils, that is, those oil fractions obtained by distillation of the original crude oil and are substantially saturated in nature. It has been discovered that if such oils are treated in accordance with the present invention, it is possible to produce a satisfactory product without the necessity of the so-called "Doctor Treat," i. e. treating the oil with a solution of lead oxide in aqueous caustic soda solution together with elemental sulfur with the conversion of the mercaptans to disulfides and the precipitation of insoluble lead sulfide.

The concentration of the solution of alkali metal hydroxide used should be between 0.7 and 14° Bé. (0.5–10% by weight) and preferably should be about 3° Bé. (2% by weight). The concentration of the emulsifying agent should vary between 0.05 and 1.0% in the aqueous phase while that of the petroleum phenols used varies between 0.05 and 0.2% in the oil phase.

An important part of this invention is the use of such concentrations of the alkali and the emulsifying agent that separation of the emulsion into the oil and aqueous phases readily occurs on lowering the temperature of the emulsion 10–50° C. By this means, separation of the aqueous phase from the treated oil is accomplished without difficulty and at a cost only slightly greater than that when no emulsifying agent is used. If, on the other hand, the emulsion is not readily broken on cooling, and the emulsion must be broken by acidification or by precipitation of the emulsifying agent, the process becomes unattractive from an economic standpoint.

The types of emulsifying and alkaline agents employed will vary depending upon the concentrations used and the temperature at which contacting with the oil is carried out. When using sodium hydroxide as the alkali and sodium rosinate as the emulsifier and treating in the temperature range of 50° C., it is necessary to use concentrations of the NaOH below about 10% in order to avoid total precipitation of the rosinate. When using 2% of NaOH, as much as 0.25% of sodium rosinate is soluble in the aqueous phase at 50° C. However, on cooling to 25° C., a sufficient proportion of the rosinate is "salted out" by the alkali so that breaking of the emulsions occurs.

When using a more soluble system such as potassium hydroxide and the potassium salt of the emulsifier, higher concentrations of one or both of the ingredients may be used. For example, when using a 4% solution of KOH, 0.25% of potassium rosinate was soluble in the alkali at ordinary temperatures.

In such a system the alkali, as an electrolyte, acts as the salting out agent for the colloidally dispersed emulsifying agent. In some systems, the alkali may be used in insufficient concentration to salt out the emulsifier at the temperature desired. In such a case it is desirable to use another electrolyte, such as sodium chloride, in order to cause precipitation at the desired temperature.

The aqueous layer may be recycled if used on a batch basis. However, the process is preferably carried out on a continuous basis using a series of mixing, cooling, and separation units, followed by reheating and repeating the process. Heat exchangers are employed to keep heating and cooling costs to a minimum.

The process of the present invention may be more readily understood by reference to the following example illustrating embodiments of the same.

Example

A series of runs were made in which air was bubbled slowly through a mixture of 200 cc. of a virgin petroleum naphtha (boiling in the range from 125 to 200° F.) and 200 cc. of various concentrations of sodium hydroxide solution containing in most cases 0.2% of petroleum phenols. Runs were made with and without emulsifiers. Contact was made at 50° C. while mixing. Except in the case of the potassium compounds, when using an emulsifier the mixture was quickly cooled to about 25° C. in order to get phase separation. In the case of run 15 it was necessary to cool to 0° C. in order to get separation. Data from these runs are summarized in the table.

The degree of sweetening of the naphtha was determined by the so-called copper number test, results of which are reported in milligrams of mercaptan sulfur per 100 milliliters of naphtha. This determination is made by a direct titration of the naphtha with a copper reagent ($Cu(OH)_2$ as active ingredient).

Table

[All runs in 500 cc. 3-neck flask with 200 cc. volumes each of naphtha and aqueous phase unless otherwise stated Air bubbled slowly through system while agitating mechanically at 50° C.]

| Run | Conc'n NaOH in Aqueous Phase | Conc'n Emulsifier in Aqueous Phase | Conc'n Pet. Phenols in Naphtha | Contact Time | Copper No. |
|---|---|---|---|---|---|
| 1 | Control, no treatment | | | | 13 |
| 2 | None | None | None | 30' | 13 |
| 3 | do | do | 0.2% | 30' | 13 |
| 4 | 45% (10 cc.) | do | None | 30' | 7 |
| 5 | do | do | 0.2% | 30' | 2 |
| 6 | do a | do | 0.2% | 30' | 5 |
| 7 | do | 0.1% Sod. Rosinate b | 0.2% | 30' | 2 |
| 8 | 5% | 2% Sod. Rosinate c | 0.2% | 30' | <1 |
| A {9 | 2% | None | 0.2% | 5' | 1.3 |
| A {10 d | 2% | 0.25% Sod. Rosinate | 0.2% | 5' | 0.3 |
| B {11 | 2% | None | 0.2% | 2' | 2.5 |
| B {12 | 2% | 0.25% Sodium Rosinate | 0.2% | 2' | 2 |
| {13 | 2% | None | None | 5' | 3.5 |
| {14 | 2% | 0.25% Sodium Rosinate | do | 5' | 2 |
| {15 e | 4% (KOH) | 0.25% Potassium Rosinate | 0.2% | 2' | <0.5 |
| C {16 | 2% | None | 0.2% | 5' | 2½ |
| {17 | 10% | 1% Daxad 11 f | 0.2% | ½ hr. | 1 |
| {18 | 2% | 0.25 Daxad 11 f | 0.2% | ¼ hr. | 2 |
| {19 | 2% | 1% Emulphor-O g | 0.2% | 5' | 1½ | a Nitrogen bubbled rather than air.
b Rosinate precipitated out.
c Rosinate only partially dissolved.
d Repeat run gave 0.1 copper number.
e Run at 25° C. instead of 50° C.
f Polymerized sodium salts of alkyl naphthalene sulfonic acids (alkyl short chain)
g Condensation product of oleyl alcohol and ethylene oxide.

The first six runs in the table served to demonstrate that alkali, air, and petroleum phenols are all necessary in order to get maximum reduction in copper number of the petroleum naphtha. Run #7 using the emulsifier, sodium rosinate, is not better than run #5 without emulsifier since the strong 45% NaOH completely precipitates the rosinate. When lowering the alkali concentration to 5%, run #8, the rosinate partially dissolves resulting in a copper number of the naphtha of less than one.

The pairs of runs A, B, and C indicate that the use of the emulsifier gives lower copper numbers in all cases. Run 15 shows the advantage of a higher alkali concentration when by using potassium hydroxide it is possible to keep the rosinate in solution. This same higher concentration could be used in case of sodium hydroxide and still retain solution of the sodium rosinate by increasing the temperature to 80–90° C. Runs 17 through 19 show that other types of emulsifiers are also quite effective.

It is demonstrated by these runs that superior sweetening of the naphtha results when using an emulsifier regardless of the concentration of alkali and contact time employed when not using emulsifiers.

The nature and objects of the present invention having been thus fully set forth, what is claimed as new and useful and desired to be secured by Letters Patent is:

1. Process for sweetening a virgin petroleum naphtha which comprises contacting the naphtha with an oxygen-containing gas in the presence of a sodium hydroxide having a concentration between 0.5 and 10% by weight and containing about 0.05 and 1% of alkali metal rosinate and 0.05 and 0.5% of petroleum phenols, mechanically agitating the mixture to form an emulsion and then cooling the emulsion about 10–50° C. whereupon the emulsion separates into an oil and an aqueous phase.

2. Process according to claim 1 in which the caustic has a concentration of about 2% by weight.

3. Process according to claim 2 in which the surface active agent is sodium rosinate.

4. Process according to claim 2 in which the surface active agent is potassium rosinate.

HAROLD A. RICARDS, Jr.
BYRON M. VANDERBILT.
ERVING ARUNDALE.

References Cited in the file of this patent

UNITED STATES PATENTS

| Number | Name | Date |
| --- | --- | --- |
| 2,317,055 | Henderson et al. | Apr. 20, 1943 |
| 2,329,615 | Hoover | Sept. 14, 1943 |
| 2,447,051 | Bond et al. | Aug. 17, 1948 |
| 2,447,529 | Perkins | Aug. 24, 1948 |
| 2,481,570 | Champagnat | Sept. 13, 1949 |